March 13, 1934.  J. H. RYALLS  1,951,259
BATTERY TERMINAL
Filed Feb. 20, 1932
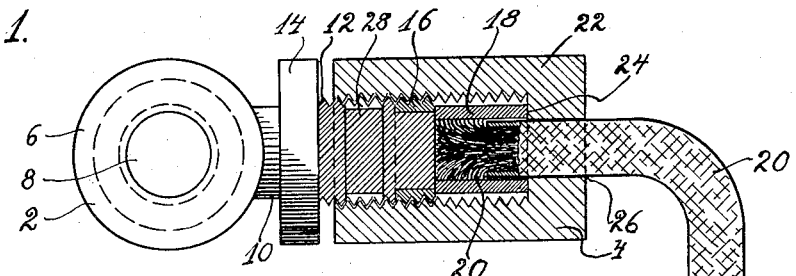
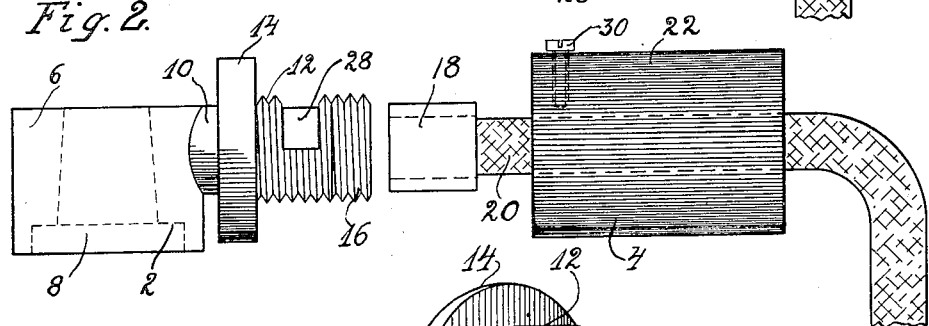
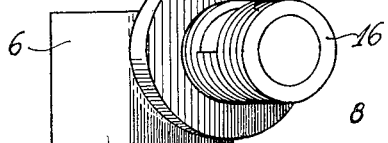
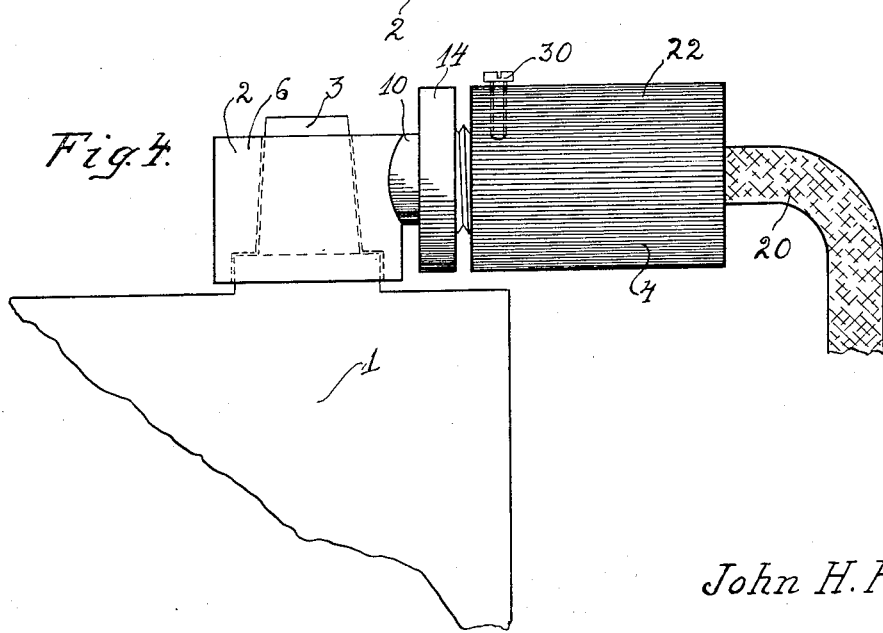
Inventor
John H. Ryalls.
By
Attorney Patented Mar. 13, 1934

1,951,259

UNITED STATES PATENT OFFICE 1,951,259

BATTERY TERMINAL

John H. Ryalls, Richmond, Va., assignor of fifty-one per cent to Halstead S. Hedges, Charlottesville, Va.

Application February 20, 1932, Serial No. 594,325

7 Claims. (Cl. 173—259)

This invention relates to electrical terminals or couplings and has particular reference to a terminal for storage batteries such as are widely used in the ignition and starting systems of automobiles.

Battery terminals heretofore used, or suggested for use, in coupling the storage battery of an automobile to the distributing cable have possessed certain well-known defects which have reduced the efficiency of motor operation and also frequently caused great inconvenience and hardships upon automobile operators. Although these prior terminals have assumed many different forms, all of those known to me have been subject to the attacks of corrosion and have suffered all of the well-known disadvantages which result therefrom such as broken wires, ill-made and improper contacts and great difficulties of attachment and removal. Not only does the corroded terminal seriously interfere with the efficiency of the battery and the electrical circuit of which it is a part, but the removal of a corroded terminal from the battery post is an exceedingly difficult operation, frequently requiring a great amount of time and necessitating the use of enormous strength, special tools and equipment. Even under the most favorable conditions and with all the tools of a fully-equipped garage available, the removal of a corroded battery terminal may at times not be accomplished without irreparable injury to the battery itself.

A general object of the present invention is to provide a new and improved battery terminal which completely eliminates the disadvantages and defects which have heretofore attended the use of prior terminals.

A further object is to provide a battery terminal for automobiles which will reduce corrosion to a minimum, and which, after service, may be readily detached and removed from the battery without difficulty, by hand, and without the assistance of special tools or equipment.

A further object is to provide an improved battery terminal which is constructed of a minimum number of parts, can be manufactured at a comparatively low cost, and which is sturdy and durable in construction and capable of withstanding the most severe service tests to which it might be subjected.

These and other features of the invention will appear more fully from the following detailed description when read in conjunction with the accompanying drawing and will be pointed out in the appended claims.

In the drawing:

Fig. 1 is a top plan view of the invention with parts in section.

Fig. 2 is a side elevation showing the parts in unassembled relation.

Fig. 3 is a perspective view of the section which is attached to the battery.

Fig. 4 is a side elevation showing the invention in assembled position and mounted on a battery.

In the embodiment of the invention shown in the drawing for purposes of illustration, the terminal of my invention is formed in two sections, one of which, indicated generally at 2 is adapted to be permanently attached to the battery post and to become a fixed part of the battery, and a second section 4 securely affixed to the end of the distributing cable and which is adapted to be detachably connected to the battery section.

The section 2 of the terminal consists of a cylindrical member 6, preferably of lead or similar non-corrosive material, having an internal tapering bore 8 conforming in size and shape to the battery post 3 of a battery 1 on which it is to be mounted and adapted to fit snugly upon and embrace such post. When assembled on the battery post, the member 6 is permanently anchored thereto in any suitable manner, such as by burning, soldering or filling with molten lead.

Projecting laterally from the member 6 at right angles thereto is an extension 10, the major portion of which is screw threaded as at 12. A flange 14 of enlarged diameter is preferably provided on the extension between the threaded part and the member 6. The member 6 and the extension 10 are preferably molded to form a one-piece unit, the extension 10 being also formed of lead or similar non-corrosive material.

For a purpose to be hereinafter described, the threads of the extension member adjacent its outer end are formed of brass or other comparatively hard metal as at 16. Although brass is much more susceptible to corrosion than lead, and is therefore to be avoided in a non-corrosive terminal, the brass which I employ to form a portion of the threads of the extension is so effectively covered as to prevent its attack by corrosive reagents. These brass threads may be formed on an annular band which is placed on a reduced extension of the member 12 and brazed or welded in place.

The second or detachable section of the terminal consists of a brass ring, cap or spacing member 18 which surrounds, and is permanently attached to, the bared end of the insulated distributing cable 20 which leads the current from the battery to the various points of consumption.

The complete electrical circuit is established when the outer end of the brass ring 18 on the distributing cable is contacted with the end of the extension 10 mounted upon the battery post and this point of contact must be cleanly preserved and protected if the battery circuit is to function at its maximum efficiency. Any corrosion at this point or a loose or insecure contact from any cause will effectively reduce the efficiency of the circuit and the motor operations which are dependent thereon.

Constant and efficient contact between the extension 10 and the distributing cable 20 is brought about and maintained by means of a coupling member 22. This coupling member is preferably formed of hard rubber, Bakelite, or any other suitable insulating material. The coupling member has an internal bore threaded to fit the threads on the extension 10. One end of this bore is fully open while the other end is partly closed by a shoulder 24 leaving an opening 26 large enough to permit the passage of the distributing cable.

The contact portions of the terminal are brought into abutting and contacting relation when the coupling member 22 is threaded upon the extension 10 and screwed into the position indicated in Figs. 1 and 4 of the drawing. It will be observed that the connection and disconnection of the terminal is a result of a simple threading operation which can be performed by hand without requiring the use of tools. When assembled, the contact portions of the battery circuit are effectively insulated and shielded from corroding agencies such as air and acids by the connecting coupling member 22.

The threaded portion of the extension 10 and the brass ring 18 of the distributing cable are so proportioned that, when the parts are assembled, the abutting contact points will be located approximately at the longitudinal center of the coupling member 22 and equally spaced from each end of the coupling member. This construction affords the maximum protection of the contact points which are thus remotely situated with respect to each end of the protecting coupling member. The assembly of the terminal is practically fool-proof as the contact points will inevitably be brought into the position of maximum protection when the coupling member is screwed onto the extension as far as the brass cap on the distributing cable will permit. In other words, the brass cap on the end of the distributing cable will control and limit the threaded movement of the insulating coupling member on the extension 10.

The brass cap 18 on the distributing cable has an external diameter which closely approximates the internal diameter of the insulating coupling member 22 and acts in conjunction with the flange or shoulder 24 on the insulating coupling member to close that end of the coupling member completely and to prevent the entrance of dirt, acids, air or extraneous matter which might otherwise leak in through the cable-entrance 26.

If desired, I may omit or cut away a portion of the lead threads as at 28, thus leaving a gap therein. A set screw 30 is threaded in the coupling member 22 and engages in this gap as an additional safeguard to prevent loosening of the connection. It will be noted that the gap is located entirely within the coupling member 22 when the terminal is assembled so that the sealing effect produced by the lead threads is not affected.

The formation of the outer threads of the extension 10 of brass or similar hard metal, serves to maintain the integrity of the threads and avoids distortion and mutilation through careless manipulation, it having been found that lead threads are too soft and distortable for practical purposes and service requirements. Moreover, the hardness of the brass permits more exact machining of the threads formed thereof and a closer screw joint between the threads of the extension and the internal threads of the insulating coupling member can be obtained. Furthermore, the formation of the threads of the extension 10 of two metals of varying hardness has the additional advantage of holding the connecting coupling member in proper position without additional locking means. The tendency of the lead threads on the one hand to distort when the insulating coupling member is screwed thereon, and the resistance of the brass threads to a similar distortion results in a pressure upon the internal threads of the coupling member which acts to prevent accidental displacement, and the resulting pressure between the threads of the extension 10 and the threads of the coupling member 22 produces an excellent air-tight joint.

A terminal of the construction herein disclosed has proven under most exacting tests to be corrosion-proof, and this result is obtained without the use of grease, oils or other special packings which have been previously suggested. The terminal will maintain a clean and efficient contact between the battery and the distributing cable indefinitely. It is durable in construction and will withstand the knocks of unskilled laborers or the most careless mechanic. In a battery circuit provided with my terminal, the distributing cable may be attached to and detached from the battery by a very simple screwing operation which can be readily performed by hand without the assistance of tools.

As will be evident, the brass threads are formed on the exterior of a sleeve which is fixed on the outer end of the extension 10. This sleeve is secured in place in any suitable manner. The spacing member 18, as shown in Fig. 1, engages the end of the brass sleeve 16 when the coupling member 4 is screwed into place. This effect is produced by making the spacing member 18 of an external diameter greater than the internal diameter of the brass sleeve 16. The limiting action of the spacing member thus acts on the brass threads and not on the lead.

Having thus described the invention, what I claim as new and desire to secure by Letters Patent of the United States is:

1. A terminal for storage batteries comprising a member of non-corrosive metal adapted to be mounted upon the post of the battery, a portion of said member being externally screw-threaded and the threads being formed of metals of different hardness, and a coupling member of insulating material having internal threads adapted to engage the threads on said metal member and having means to hold the end of a cable against said externally threaded portion.

2. A terminal for storage batteries comprising a member of non-corrosive metal adapted to be secured to the battery post and having threads thereon formed of two materials of different hardness, the outermost threads being of the harder material, and an internally threaded element having means to receive and hold the end of a distributing cable and engaging said threads to press the end of said cable against said member.

3. A storage battery terminal comprising a member formed of non-corrosive metal and having a portion adapted to be secured to the post of the battery and an extension, the base portion of said extension having threads thereon, the outermost threads being formed of a metal harder than the non-corrosive material, a coupling member of insulating material having internal threads engageable with the threads on said extension, said coupling member having means to receive the end of a distributing cable and hold the same tightly against said extension.

4. A terminal for storage batteries comprising a member adapted to be permanently and non-removably connected to the battery post, an integral extension on said member having screw threads thereon, the major portion of said member and extension being formed of a relatively soft non-corrosive metal, the outer threads on said extension being formed of a different and harder metal, a cylindrical element of insulating material having a central screw threaded bore adapted to engage the threads on said extension, an inwardly extending circular flange on one end of said element which provides a reduced opening for receiving a distributing cable, a ring of a relatively hard metal having an external diameter approximating the internal diameter of the element and mounted in the end of the element adjacent to the cable opening, the said metallic ring being adapted to receive the end of the distributing cable and to connect the cable and element together while permitting relative rotation therebetween.

5. A storage battery terminal comprising a member formed of non-corrosive metal and having a portion adapted to be secured to the post of the battery and an extension, the said extension having threads thereon, the outermost threads being formed of a metal harder than the non-corrosive material, the innermost threads being formed of the non-corrosive material, a coupling member of insulating material having internal threads engageable with the threads on said extension, said coupling member having means to receive the end of a distributing cable and hold the same tightly against said extension and means within said coupling member to limit movement of said coupling member inwards towards said battery post portion.

6. A terminal for storage batteries comprising a member of non-corrosive soft metal adapted to be secured to the battery post and having an extension thereon, a sleeve fixed on said extension and extending to the free end thereof, said sleeve being externally threaded and formed of a hard metal, a coupling member of insulating material internally threaded to engage said sleeve and having means to receive the end of a cable and hold it against said extension, and a spacing member of hard metal within said coupling member at the end of said extension, said spacing member engaging the end of said sleeve and thereby limiting the inward movement of said coupling member on said extension.

7. A terminal for storage batteries comprising a member of non-corrosive soft metal adapted to be secured to the battery post and having an extension thereon, a sleeve fixed on said extension and extending to the free end thereof, said sleeve being externally threaded and formed of a hard metal, a coupling member of insulating material internally threaded to engage said sleeve and having means to receive the end of a cable and hold it against said extension, and a spacing member of hard metal within said coupling member at the end of said extension, said spacing member having an external diameter greater than the internal diameter of said sleeve and engaging the end of said sleeve and thereby limiting the inward movement of said coupling member on said extension.

JOHN H. RYALLS.